(12) United States Patent
Rutar et al.

(10) Patent No.: US 11,598,267 B2
(45) Date of Patent: Mar. 7, 2023

(54) FLOW DIVIDER VALVE WITH RELIEF MANAGEMENT VALVE

(71) Applicant: Hamilton Sundstrand Corporation, Charlotte, NC (US)

(72) Inventors: Matej Rutar, Manchester, CT (US); Francis P. Marocchini, Somers, CT (US); Aaron F. Rickis, Long Meadow, MA (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/219,028

(22) Filed: Mar. 31, 2021

(65) Prior Publication Data
US 2021/0301725 A1 Sep. 30, 2021

Related U.S. Application Data

(60) Provisional application No. 63/002,935, filed on Mar. 31, 2020.

(51) Int. Cl.
| | |
|---|---|
| *F02C 7/232* | (2006.01) |
| *F02C 9/34* | (2006.01) |
| *F02C 7/228* | (2006.01) |
| *F01D 21/14* | (2006.01) |

(52) U.S. Cl.
CPC .............. *F02C 7/232* (2013.01); *F01D 21/14* (2013.01); *F02C 7/228* (2013.01); *F02C 9/34* (2013.01); *F05D 2270/3015* (2013.01)

(58) Field of Classification Search
CPC ............ F02C 7/22; F02C 7/222; F02C 7/228; F02C 7/232; F02C 9/28; F02C 9/34; F02C 9/263; F23K 5/06; F23N 2235/18
See application file for complete search history.

(56) References Cited

U.S. PATENT DOCUMENTS

| | | |
|---|---|---|
| 5,406,798 A | 4/1995 | Wiesner, Jr. |
| 5,809,771 A | 9/1998 | Wernberg |
| 6,314,998 B1* | 11/2001 | Futa, Jr. ................ F02C 7/232 239/119 |
| 6,334,296 B2 | 1/2002 | Futa, Jr. et al. |

(Continued)

OTHER PUBLICATIONS

Extended European Search Report dated Aug. 6, 2021, issued during the prosecution of European Patent Application No. EP 21165378.7 (7 pages).

*Primary Examiner* — Alain Chau
(74) *Attorney, Agent, or Firm* — Locke Lord LLP; Scott D. Wofsy; Alicia J. Carroll

(57) ABSTRACT

A system includes a flow inlet conduit and a primary conduit that branches from the flow inlet conduit for delivering flow to a set of primary nozzles. An equalization bypass valve (EBV) connects between the flow inlet conduit and a secondary conduit for delivering flow to a set of secondary nozzles. The EBV is connected to an equalization conduit (EC) to apportion flow from the flow inlet conduit to the secondary conduit. A pressure equalization solenoid (PES) is connected to the EC to selectively connect at least one of a servo supply pressure (PFA) conduit or return pressure (PDF) conduit into fluid communication with the EC. A relief management valve (RMV) is connected in the PDF conduit.

23 Claims, 3 Drawing Sheets

(56) References Cited

U.S. PATENT DOCUMENTS

| | | | |
|---|---|---|---|
| 6,484,510 B2 * | 11/2002 | Futa, Jr. ................. F02C 7/232 |
| | | | 60/790 |
| 8,316,630 B2 | 11/2012 | Futa et al. |
| 9,234,465 B2 | 1/2016 | Futa et al. |
| 9,574,448 B2 * | 2/2017 | Snodgrass ............... F02C 7/228 |
| 10,502,138 B2 | 12/2019 | Reuter et al. |
| 10,598,097 B2 * | 3/2020 | Doody .................... F23R 3/346 |
| 2007/0245744 A1 * | 10/2007 | Dooley ................... F01D 21/06 |
| | | | 60/39.094 |
| 2010/0050593 A1 | 3/2010 | Futa et al. |
| 2017/0241346 A1 * | 8/2017 | Thompson ................ F02C 9/26 |
| 2017/0268781 A1 * | 9/2017 | Stevenson ................ F02C 9/34 |
| 2017/0298840 A1 * | 10/2017 | Doody ................... F02C 7/232 |
| 2018/0163630 A1 * | 6/2018 | Bickley ..................... F23K 5/06 |
| 2018/0163636 A1 * | 6/2018 | Griffiths ................. F02C 7/222 |
| 2018/0372321 A1 | 12/2018 | Yates et al. |
| 2018/0372323 A1 * | 12/2018 | Griffiths ................. F02C 7/228 |
| 2019/0032509 A1 * | 1/2019 | Muldal ................. G01K 1/026 |
| 2021/0025330 A1 * | 1/2021 | Reuter ..................... F23R 3/34 |

\* cited by examiner

FLOW DIVIDER VALVE WITH RELIEF MANAGEMENT VALVE

CROSS-REFERENCE TO RELATED APPLICATIONS

This application claims priority to and the benefit of U.S. Provisional Application No. 63/002,935, filed Mar. 31, 2020, the entire contents of which are herein incorporated by reference in their entirety.

BACKGROUND

1. Field

The present disclosure relates to flow splitting systems, and more particularly to flow divider valves such as for use in aerospace fuel systems.

2. Description of Related Art

Gas turbine burners can have at least two sets of fuel injection nozzles, e.g., primary nozzles and secondary nozzles. Valves are used to control the flow split between the primary and secondary nozzles. There are transitions from one flow split to another that need to be rate controlled to prevent disturbances, especially at low flow conditions. The better the time response when switching from one flow split to another without disturbances, the better the system can perform.

The conventional techniques have been considered satisfactory for their intended purpose. However, there is an ever present need for improved systems and methods for flow divider valves. This disclosure provides a solution for this need.

SUMMARY

A system includes a flow inlet conduit and a primary conduit that branches from the flow inlet conduit for delivering flow to a set of primary nozzles. An equalization bypass valve (EBV) connects between the flow inlet conduit and a secondary conduit for delivering flow to a set of secondary nozzles. The EBV is connected to an equalization conduit (EC) to apportion flow from the flow inlet conduit to the secondary conduit. A pressure equalization solenoid (PES) is connected to the EC to selectively connect at least one of a servo supply pressure (PFA) conduit or return pressure (PDF) conduit into fluid communication with the EC. A relief management valve (RMV) is connected in the PDF conduit.

The RMV can include an orifice flow path, a secondary flow path, and a valve body that occludes the secondary flow path in first position and permits flow through the secondary flow path in a second position. The EBV can include a piston that divides flow between the EC and the flow inlet conduit to apportion flow from the flow inlet conduit to the secondary conduit based on a pressure differential between a flow meter pressure at the flow inlet conduit and a pressure in the EC. The PES can include a valve body positioned to selectively control the EBV by connecting at least one of the PFA conduit or the PDF conduit to switch the primary conduit and the secondary conduit between an equalized mode, where the primary and secondary conduits are at equal pressure, and an un-equalized mode, where the primary and secondary conduits are at unequal pressure.

The pressure in the EC can be at least one of a PFA or a PDF. An un-equalized enrichment valve (UEV) can connect between the flow inlet conduit and the secondary conduit. The UEV can be configured to pressurize the primary conduit higher than the secondary conduit in an un-equalized mode. The RMV can be configured to increase flow through PDF conduit as the difference between PFA and PDF is increased. The RMV can be configured to reduce flow through PDF conduit when the difference between PFA and PDF is lower, relative to the increased pressure difference. An EBV rate limiting high-pressure orifice can be connected in the PFA conduit.

In accordance with another aspect, a method includes selectively increasing or decreasing flow through the RMV by opening or closing a secondary flow path in parallel to an orifice flow path. The method can include increasing flow through the RMV when the difference between PFA and PDF pressure is greater than PDF and a RMV opening pressure. The method can include decreasing flow through the RMV when the difference between PFA and PDF pressure is less than a RMV opening pressure. The method can include selectively controlling the EBV with the PES.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
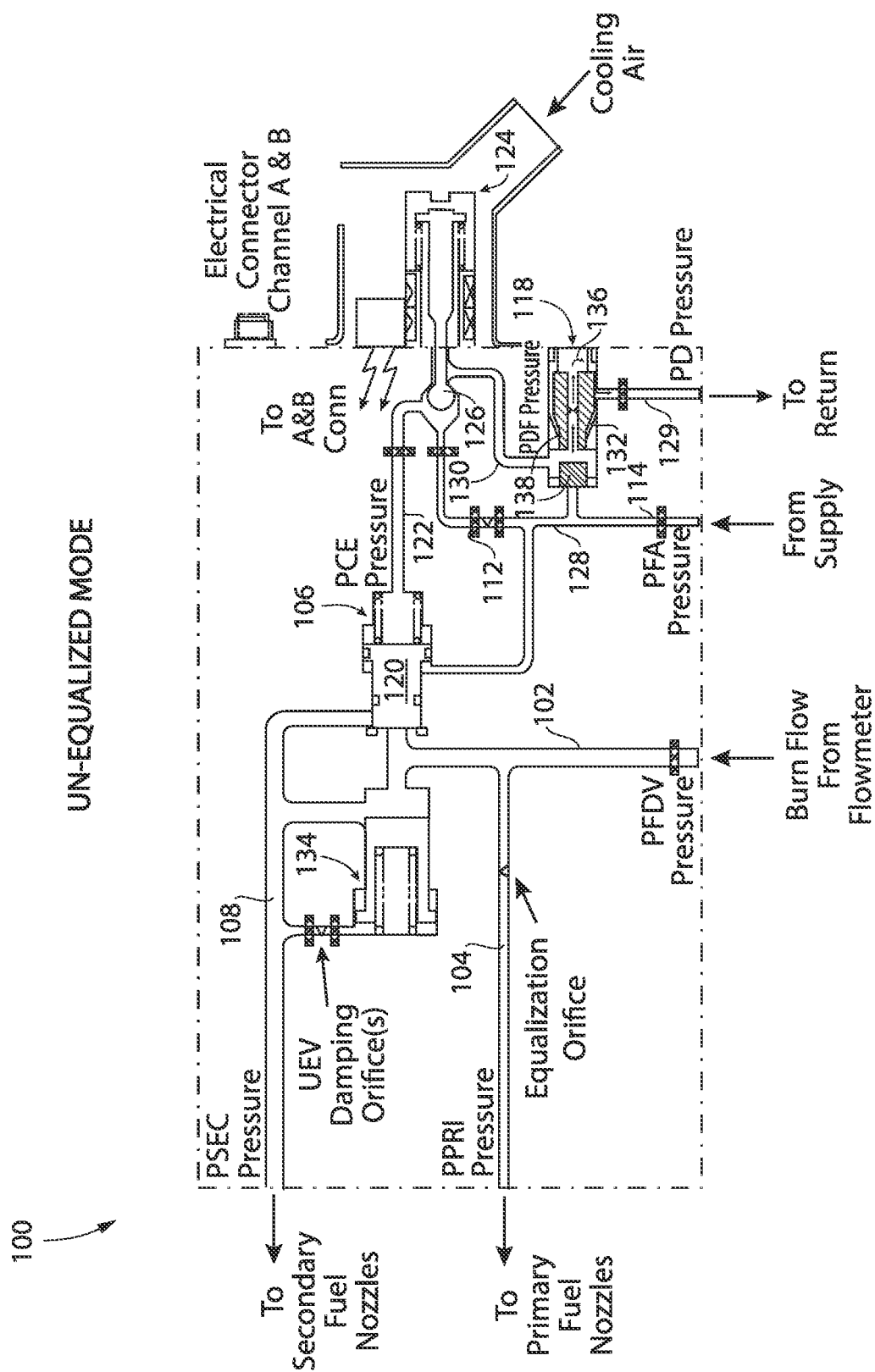
FIG. 1 is a schematic view of an embodiment of a system constructed in accordance with the present disclosure, showing the inlet flow conduit, primary conduit, secondary conduit, and the EBV, all in un-equalized mode and the RMV closed.
Figure 2:
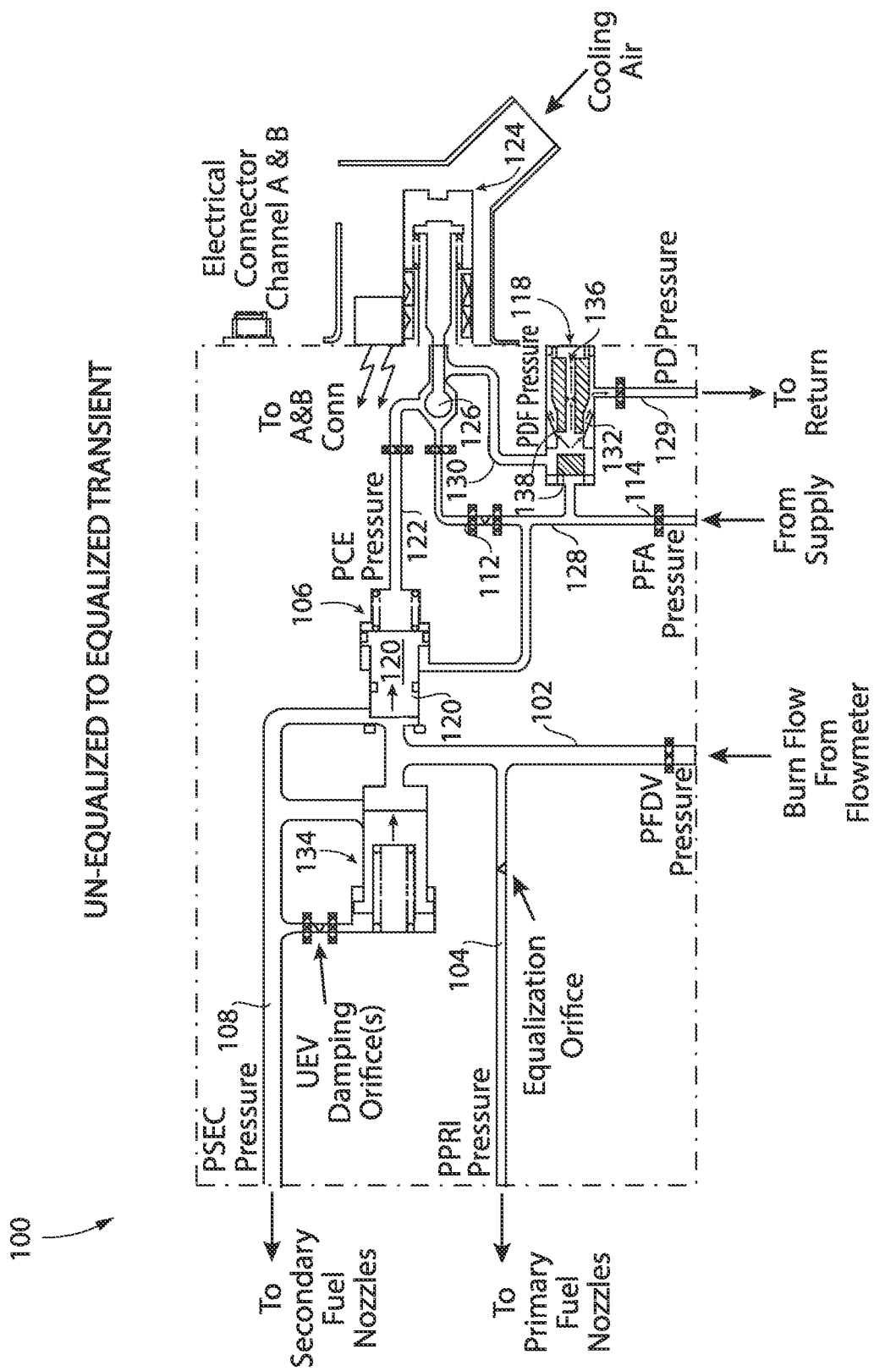
FIG. 2 is a schematic view of an embodiment of the system of FIG. 1, showing the transition between un-equalized mode and equalized mode, with the RMV open.
Figure 3:
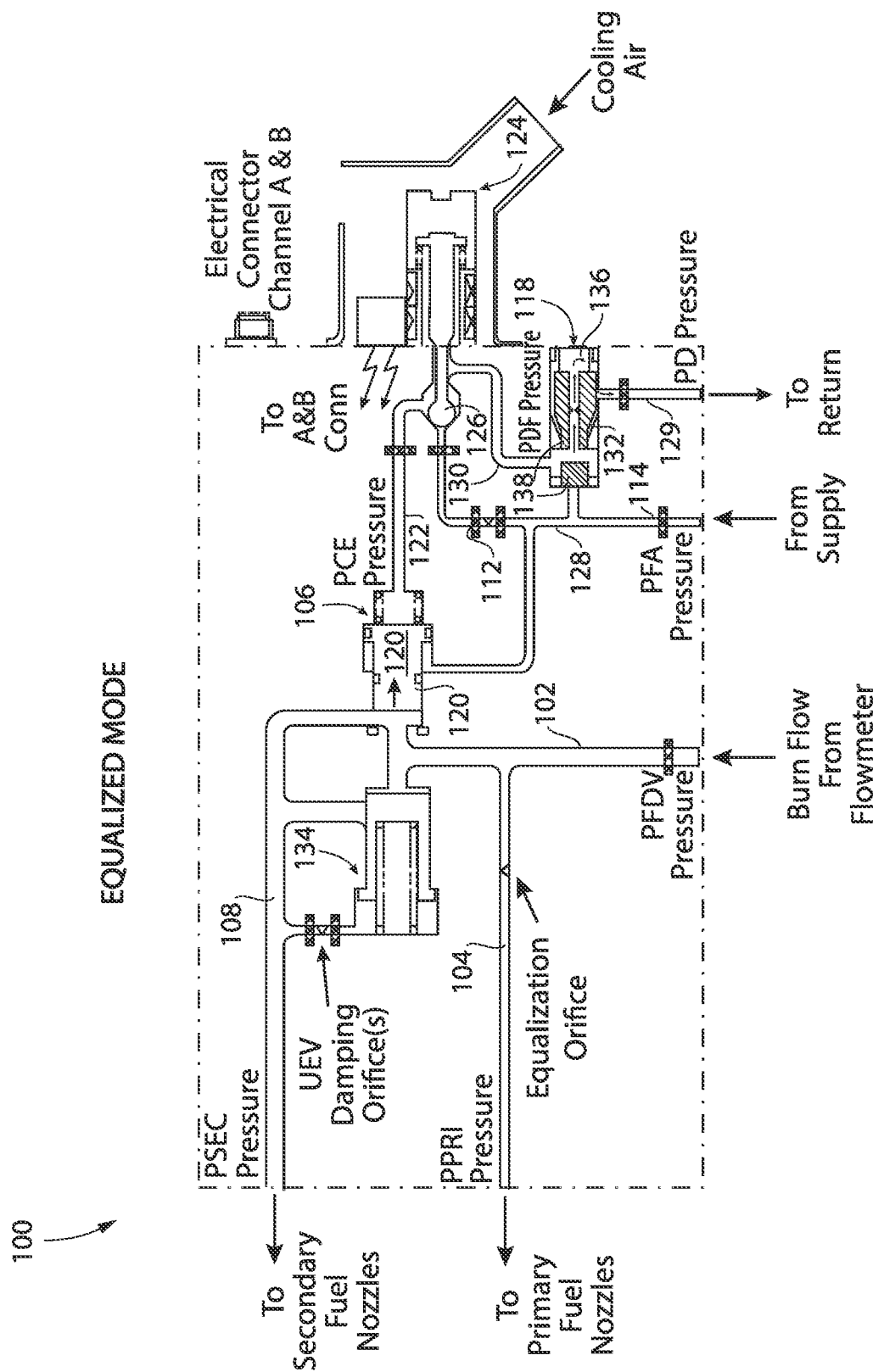
FIG. 3 is a schematic view of an embodiment of the system of FIG. 1, showing the equalized mode and the RMV closed.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are shown in FIGS. 2-3 and described below. The systems and methods described herein can be used to provide for variable rate limiting when transitioning between equalized and un-equalized modes without causing large fuel flow disturbances relative to traditional flow division systems that divide flow between a primary set of fuel nozzles and a secondary set of fuel nozzles. For rapid transients, rate limiting is reduced by a relief management valve which is set to open at higher pressures to reduce transition times. This allows for much faster flow split transitions relative to traditional systems, and/or reduce the resulting fuel flow disturbance at lower pressures. The systems and methods described herein can be retrofitted into many existing flow division systems.

As shown in FIG. 1, a system 100 includes a flow inlet conduit 102. A primary conduit 104 branches from the flow inlet conduit 102 for delivering flow to a set of primary nozzles. An equalization bypass valve (EBV) 106 connects between the flow inlet conduit 102 and a secondary conduit 108 for delivering flow to a set of secondary nozzles. The EBV 106 is connected to an equalization conduit (EC) 122 to be controlled by a pressure equalization solenoid (PES) to apportion flow, e.g. fluid flow, from the flow inlet conduit 102 to the secondary conduit 108 based on pressure differential between a flow meter pressure (PFDV) at the flow inlet conduit 102 and the servo pump supply pressure (PFA), e.g. PFDV plus PFA, and a pressure (PCE) in the EC 122. The EBV 106 is a two position valve. The PCE is switched between the PFA pressure (which closes valve since PFA>PFDV) and a return pressure (PDF) which is lower than the sum of PFDV and PFA (which opens the valve).

With continued reference to FIG. 1, the EBV 106 includes a piston 120 that separates between the EC 122 and the flow inlet conduit 102 to allow or restrict flow from the flow inlet conduit 102 to the secondary conduit 108 based on pressure differential between a flow meter pressure (PFDV) at the flow inlet conduit 102 and the servo pump supply pressure (PFA), and a pressure (PCE) in the EC 122. The PCE is switched between the PFA pressure (which closes valve since PFA>PFDV) and PDF which is lower than the sum of PFDV and PFA (which opens the valve). To increase flow to secondary nozzles in an equalized mode, the EBV 106 opens by translating to the right. An EBV rate limiting high-pressure orifice 112 is connected in the PFA 128 conduit. Transitioning equalized to un-equalized modes is rate limited by the EBV Rate Limiting HP orifice 112 to minimize unacceptable flow disturbance during transition, particularly at low burn flows.

With continued reference to FIG. 1, system 100 includes PES 124 connected to the EC 122 to switch the system 100 between an un-equalized and an equalized mode. The PES 124 includes a valve body 126 positioned to selectively PFA conduit 128 or a PDF conduit 130 into fluid communication with the EC 122 to switch the primary and secondary conduits 104, 108 between an equalized mode (FIG. 3), where the primary and secondary conduits 104, 108 are at equal pressure, and an un-equalized mode (FIG. 1), where the primary and secondary conduits 104, 108 are at unequal pressure.

As shown in FIG. 2, the rate of EBV 106 translation, as indicated schematically by the arrow on valve body 120, in some instances, was controlled by a fixed orifice in the flow path from EC 122 to an outlet portion 129 of PDF conduit 130. In embodiments of the present disclosure, the EBV rate of translation is limited by a relief management valve (RMV) 118 connected in the PDF conduit 130 to prevent unacceptable flow disturbance during transition. The RMV includes an orifice flow path 136, secondary flow path 132 (the obliquely angled passages), and a valve body 138 that occludes (or partially occludes) the secondary flow path 132 in first (closed) position, shown in FIGS. 1 and 3, and permits flow through the secondary flow path 132 in a second (open) position, shown in FIG. 2. The valve body 138 is configured to open more flow into the PDF conduit 130 by way of the secondary flow path 132 at higher differentials between PFA and PDF in the transient to the equalized mode after the valve body 126 moves to the left. This allows both 'slow' and 'fast' EBV translations to be possible when switching from equalized to unequalized modes. In high-pressure scenarios, the RMV opens up secondary flow path 132 in parallel to orifice flow path 136, when actuated open by PFA pressure in the PFA conduit 128, and bypasses the rate limiting orifice in the orifice flow path 136. This allows fast transitions at high pressure settings, while still maintaining slow transitions at low pressure settings With continued reference to FIGS. 2-3, the RMV 118 is configured to allow more flow through the PDF conduit 130 to outlet portion 129 by allowing flow through the secondary flow path 132 as the differential between PFA and PDF pressure rises (regardless of whether transitioning to equalized or unequalized mode). The RMV 118 is configured to reduce flow through the PDF conduit 130 to/from an outlet portion 129 by occluding secondary flow path 132 as the differential between PFA and PDF decreases. The RMV 118 provides additional capability to control the rate of EBV 106, thereby allowing fast transitions at high pressure conditions, but still maintain slow transitions at lower pressure settings to minimize disturbances in the rest of the fuel system 100.

As shown in FIG. 2, movement of the valve body 126 to the left of the position shown in FIG. 3 places EC 122 and PDF conduit 130 in fluid communication with one another, actuating piston 120 to the right. The pressure in the EC 122 is at least one of PFA or PDF. An un-equalized enrichment valve (UEV) 134 connects between the flow inlet conduit 102 and the secondary conduit 108. The UEV 134 is configured to pressurize the primary conduit 104 higher than the secondary conduit 108 in the un-equalized mode resulting in enriched flow to the primary nozzles, e.g. for starting and burner tonal control. In equalized mode, the pressure delivered to primary and secondary nozzles is the same and the flow split between the nozzles is a function of only the nozzle area ratio. When the EBV 106 is open, it opens a large flow path from flow inlet conduit 102 to the secondary conduit 108. When EBV 106 is closed, the only path from flow inlet conduit 102 to the secondary conduit 108 is through the UEV 134, so the UEV regulates to a high pressure from the primary conduit 104 to the secondary conduit 108 pressure.

With reference to FIGS. 1-3, during a high acceleration from idle to high power, the RMV 118 initially limits how quickly the EBV 106 can open (e.g. translate to the right as oriented in FIGS. 1-3). If the EBV 106 opens too slowly during the entire transient, too much flow is forced through the more restrictive primary circuit, resulting in a higher pressure spike in upstream components. The RMV 118 closes secondary flow path 132 at low pressure assuring that EBV 106 swept flow is restricted and rate limiting of the EBV 106 is sufficiently slow. As shown in FIG. 2, the RMV 118 is actuated open (e.g. valve body 138 is moved to the right as oriented in the figures) if the differential between PFA and PDF pressure is greater than RMV 118 opening pressure. The RMV 118 therefore allows for control of EBV open rate based on the differential between PFA and PDF. A method for controlling flow through includes controlling flow through the RMV by opening a secondary flow path in parallel to an orifice flow path when the difference between PFA and PDF is greater than an RMV opening pressure.

The methods and systems of the present disclosure, as described above and shown in the drawings, provide for variable rate-controlled split transitions to minimize the disturbances relative to traditional flow division systems that divide flow between a primary set of fuel nozzles and a secondary set of fuel nozzles. For rapid transients, the RMV permits bypassing a fixed rate limiting to assure transient over-pressurization does not occur. This can allow for much faster flow split transitions relative to traditional systems, while still maintaining slow transitions at low power to reduce fuel flow disturbances. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a flow inlet conduit;
a primary conduit that branches from the flow inlet conduit for delivering flow to a set of primary nozzles;
an equalization bypass valve (EBV) that connects between the flow inlet conduit and a secondary conduit for delivering flow to a set of secondary nozzles, wherein the EBV is connected to an equalization conduit (EC) to apportion flow from the flow inlet conduit to the secondary conduit;
a pressure equalization solenoid (PES) connected to the EC to selectively connect at least one of a servo supply pressure (PFA) conduit or a return pressure (PDF) conduit into fluid communication with the EC; and
a relief management valve (RMV) connected in the PDF conduit, wherein the RMV is configured to at least one of (i) increase flow through PDF conduit as the difference between PFA and PDF pressure is increased, or (ii) reduce flow through PDF conduit when the difference between PFA and PDF pressure is decreased.

2. The system as recited in claim 1, wherein the RMV includes an orifice flow path, a secondary flow path, and a valve body that occludes the secondary flow path in a first position and permits flow through the secondary flow path in a second position.

3. The system as recited in claim 1, wherein the EBV includes a piston that divides flow between the EC and the flow inlet conduit to apportion flow from the flow inlet conduit to the secondary conduit based on a pressure differential between a flow meter pressure at the flow inlet conduit and a pressure in the EC.

4. The system as recited in claim 3, wherein the PES includes a valve body positioned to selectively control the EBV by connecting at least one of the PFA conduit or the PDF conduit to switch the primary conduit and the secondary conduit between an equalized mode, where the primary and secondary conduits are at equal pressure, and an un-equalized mode, where the primary and secondary conduits are at unequal pressure.

5. The system as recited in claim 3, wherein the pressure in the EC is at least one of a PFA or a PDF.

6. The system as recited in claim 1, further comprising an un-equalized enrichment valve (UEV) that connects between the flow inlet conduit and the secondary conduit.

7. The system as recited in claim 6, wherein the UEV is configured to pressurize the primary conduit higher than the secondary conduit in an un-equalized mode.

8. The system as recited in claim 1, further comprising an EBV rate limiting high-pressure orifice connected in the PFA conduit.

9. A method comprising:
in a system as recited in claim 1, selectively increasing or decreasing flow through the RMV by opening or closing a secondary flow path in parallel to an orifice flow path.

10. The method as recited in claim 9, further comprising at least one of (i) increasing flow through the RMV when the difference between PFA and PDF pressure is greater than a RMV opening pressure, or (ii) decreasing flow through the RMV when the difference between PFA and PDF pressure is less than a RMV opening pressure.

11. The method as recited in claim 9, further comprising selectively controlling the EBV with the PES.

12. A system comprising:
a flow inlet conduit;
a primary conduit that branches from the flow inlet conduit for delivering flow to a set of primary nozzles;
an equalization bypass valve (EBV) that connects between the flow inlet conduit and a secondary conduit for delivering flow to a set of secondary nozzles, wherein the primary conduit branches from the flow inlet conduit upstream from the EBV, wherein the EBV is connected to an equalization conduit (EC) to apportion flow from the flow inlet conduit to the secondary conduit;
a pressure equalization solenoid (PES) connected to the EC to selectively connect at least one of a servo supply pressure (PFA) conduit or a return pressure (PDF) conduit into fluid communication with the EC; and
a relief management valve (RMV) connected in the PDF conduit.

13. The system as recited in claim 12, wherein the RMV includes an orifice flow path, a secondary flow path, and a valve body that occludes the secondary flow path in a first position and permits flow through the secondary flow path in a second position.

14. The system as recited in claim 12, wherein the EBV includes a piston that divides flow between the EC and the flow inlet conduit to apportion flow from the flow inlet conduit to the secondary conduit based on a pressure differential between a flow meter pressure at the flow inlet conduit and a pressure in the EC.

15. The system as recited in claim 14, wherein the PES includes a valve body positioned to selectively control the EBV by connecting at least one of the PFA conduit or the PDF conduit to switch the primary conduit and the secondary conduit between an equalized mode, where the primary and secondary conduits are at equal pressure, and an un-equalized mode, where the primary and secondary conduits are at unequal pressure.

16. The system as recited in claim 14, wherein the pressure in the EC is at least one of a PFA or a PDF.

17. The system as recited in claim 12, further comprising an un-equalized enrichment valve (UEV) that connects between the flow inlet conduit and the secondary conduit.

18. The system as recited in claim 17, wherein the UEV is configured to pressurize the primary conduit higher than the secondary conduit in an un-equalized mode.

19. The system as recited in claim 12, wherein the RMV is configured to at least one of (i) increase flow through PDF conduit as the difference between PFA and PDF pressure is increased, or (ii) reduce flow through PDF conduit when the difference between PFA and PDF pressure is decreased.

20. The system as recited in claim 12, further comprising an EBV rate limiting high-pressure orifice connected in the PFA conduit.

21. A method comprising:
in a system as recited in claim 12, selectively increasing or decreasing flow through the RMV by opening or closing a secondary flow path in parallel to an orifice flow path.

22. The method as recited in claim 21, further comprising at least one of (i) increasing flow through the RMV when the difference between PFA and PDF pressure is greater than a RMV opening pressure, or (ii) decreasing flow through the RMV when the difference between PFA and PDF pressure is less than a RMV opening pressure.

23. The method as recited in claim 21, further comprising selectively controlling the EBV with the PES.

* * * * *